United States Patent
Lim

(10) Patent No.: US 7,836,584 B2
(45) Date of Patent: Nov. 23, 2010

(54) JIG FOR FASTENING BOLT

(75) Inventor: Chung-Hwan Lim, Cheonan-si (KR)

(73) Assignee: Hyundai Motor Company, Seoul (KR)

( * ) Notice: Subject to any disclaimer, the term of this patent is extended or adjusted under 35 U.S.C. 154(b) by 1030 days.

(21) Appl. No.: 11/604,611

(22) Filed: Nov. 27, 2006

(65) Prior Publication Data

US 2008/0092373 A1    Apr. 24, 2008

(30) Foreign Application Priority Data

Oct. 10, 2006    (KR) .................... 10-2006-0098321

(51) Int. Cl.
    *B23P 21/00*    (2006.01)
(52) U.S. Cl. ........................................... 29/787
(58) Field of Classification Search ............... 29/700, 29/787, 795, 566; 81/57.36, 57.22, 57, 43, 81/54, 177.75
    See application file for complete search history.

(56) References Cited

U.S. PATENT DOCUMENTS 6,546,815 B2 *    4/2003    Yamada et al. ........... 73/862.21

FOREIGN PATENT DOCUMENTS

| JP | 2004195592 | * | 7/2004 |
| SU | 841949 | * | 9/1981 |

* cited by examiner

*Primary Examiner*—John C Hong
(74) *Attorney, Agent, or Firm*—Morgan, Lewis & Bockius LLP

(57) ABSTRACT

A jig for tightening a bolt includes: a support unit standing on the floor of a work place and extending toward the bottom side of a car body which is conveyed by an overhead hanger; a movable unit connected to the support unit so as to be movable in a transverse direction, a longitudinal direction, and a height direction of the car body; a fastening part disposed in the movable unit to fasten chassis components to the bottom side of the car body; a load compensating part compensating load of the fastening part when the fastening part ascends/descends toward/from the bottom side of the car body; a tilting part adjusting a position of the fastening part; and a reaction force regulating part sustaining reaction force that is generated while the fastening part is operated.

16 Claims, 9 Drawing Sheets

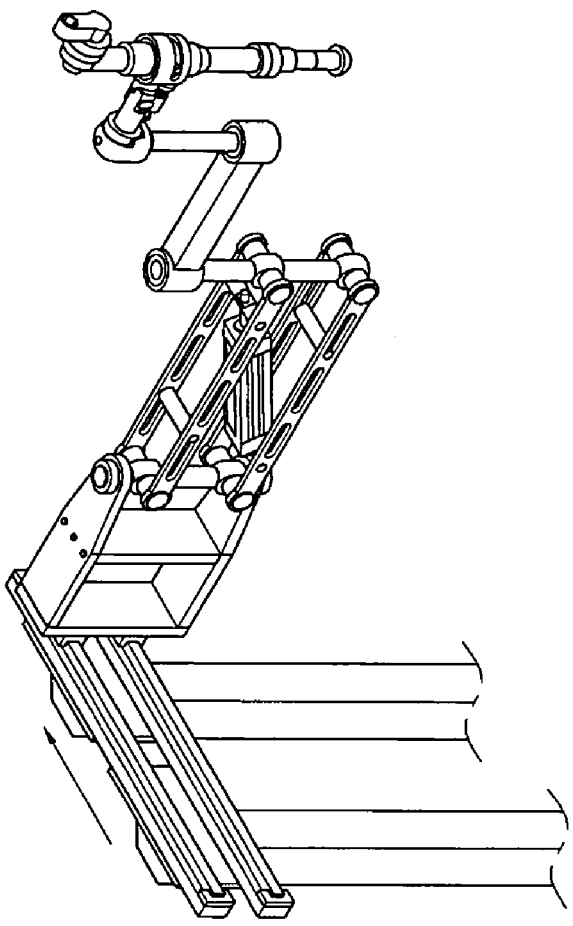
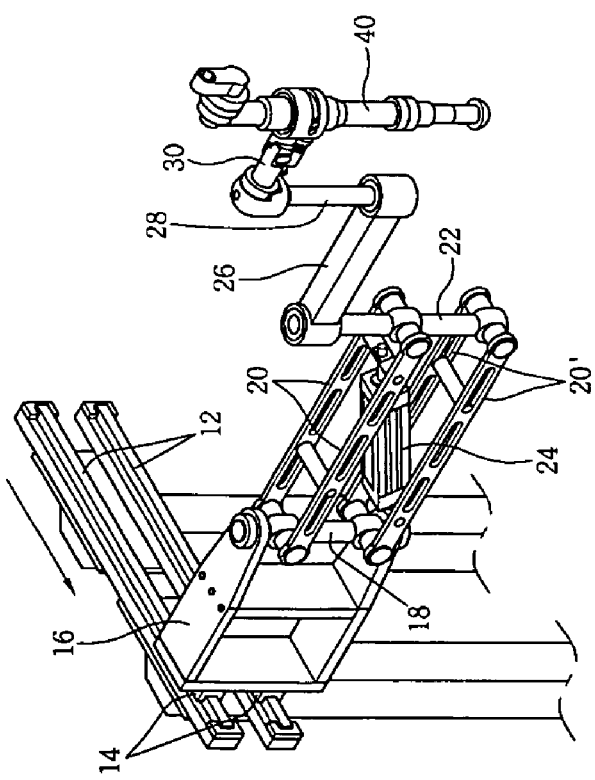
FIG.2

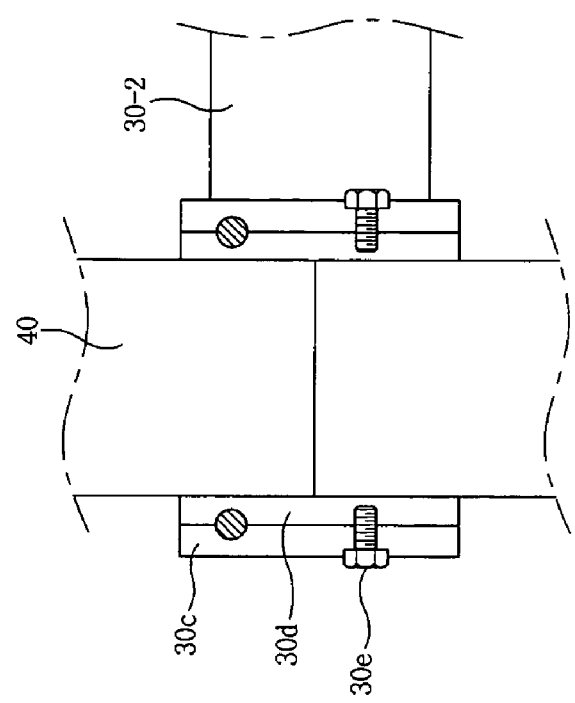
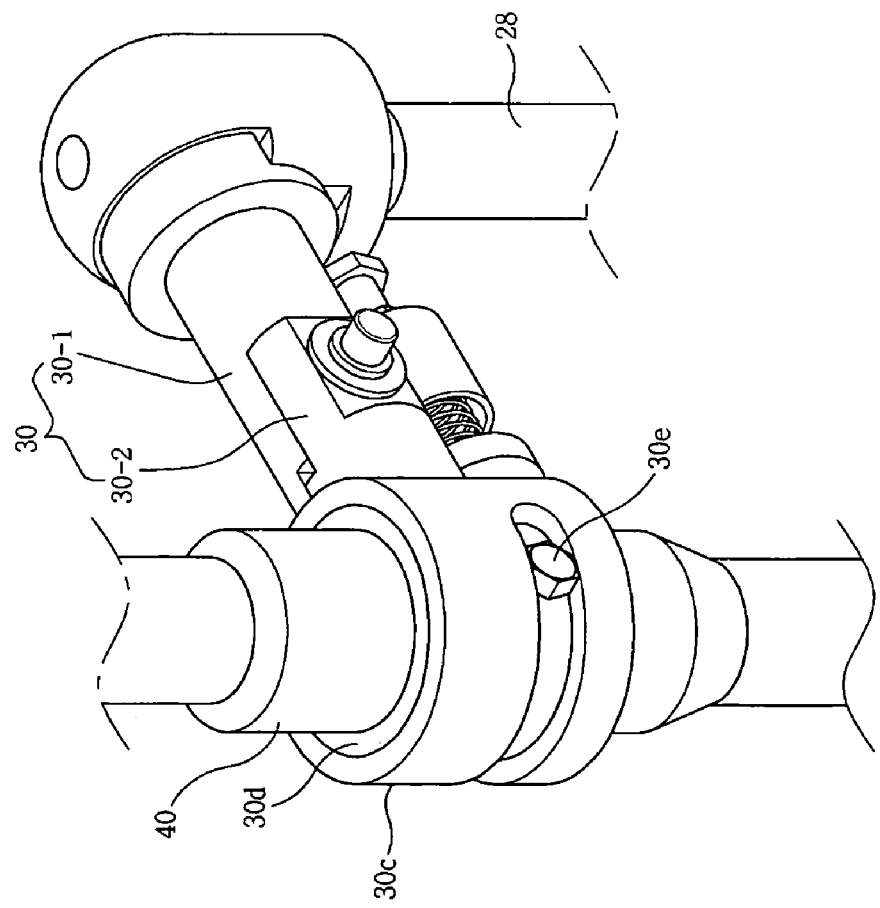
FIG.8

JIG FOR FASTENING BOLT

CROSS-REFERENCE TO RELATED APPLICATIONS

The present application is based on, and claims priority from, Korean Application Serial Number 10-2006-0098321, filed on Oct. 10, 2006, the disclosure of which is hereby incorporated by reference herein in its entirety.

FIELD OF THE INVENTION

The present invention relates to a jig for fastening a bolt, and more particularly, to a jig for fastening a bolt that is capable of easily moving a nut runner, that is, a fastening tool at a location for fastening, in a process of assembling components such as various kinds of arms provided in a suspension system of a car.

BACKGROUND OF THE INVENTION

Generally, a the car body is conveyed to each of several assembly lines by an overhead hanger that is connected to the ceiling, while a worker fastens components at the bottom of the car body. As for the process of fastening various kinds of arms to a suspension system of a car, a worker grips a manual torque wrench, and works below the car body, looking up a fastening part of arms located above the worker. In a rear wheel suspension system, a fastening torque of a nut regulating a toe and camber has a range of only 11 to 12 kgfm, which may cause harm to muscles and bones of workers.

SUMMARY OF THE INVENTION

The present invention improves assembly convenience by using a nut runner and moving the nut runner to a fastening location more easily, in the process of fastening various arms of a suspension system at the bottom of a car body that is conveyed by an overhead hanger.

An embodiment of the present invention provides a jig for tightening a bolt which includes a support unit, a movable unit, a fastening part, a load compensating part, a tilting part, and a reaction force regulating part. The support unit stands from the floor of a work place toward the bottom side of a car body which is conveyed by an overhead hanger. The movable unit is connected to the support unit so as to be movable in transverse, longitudinal, and height directions of the car body. The fastening part is disposed in the movable unit to fasten chassis components to the bottom side of the car body. The load compensating part compensates load of the fastening part when the fastening part ascends/descends toward/from the bottom side of the car body. The tilting part precisely adjusts a position of the fastening part when the fastening part moves. The reaction force regulating part sustains reaction force that is generated while the fastening part is operated. The movable unit includes a longitudinally movable part which moves the fastening part along the length direction of the car body with respect to the support unit, a vertically movable part which moves the fastening part along the height direction of the car body with respect to the support unit, and a transversely movable part which moves the fastening part along the width direction of the car body with respect to the support unit

BRIEF DESCRIPTION OF THE DRAWINGS

For a better understanding of the nature and objects of the present invention, reference should be made to the following detailed description with the accompanying drawings, in which:

FIGS. 2 to 4 are views of operating states according to an embodiment of the invention;

FIG. 8 is a view of the construction of a coupled portion between the tool housing link and a nut runner.

DETAILED DESCRIPTION OF THE PREFERRED EMBODIMENTS

Figure 1:
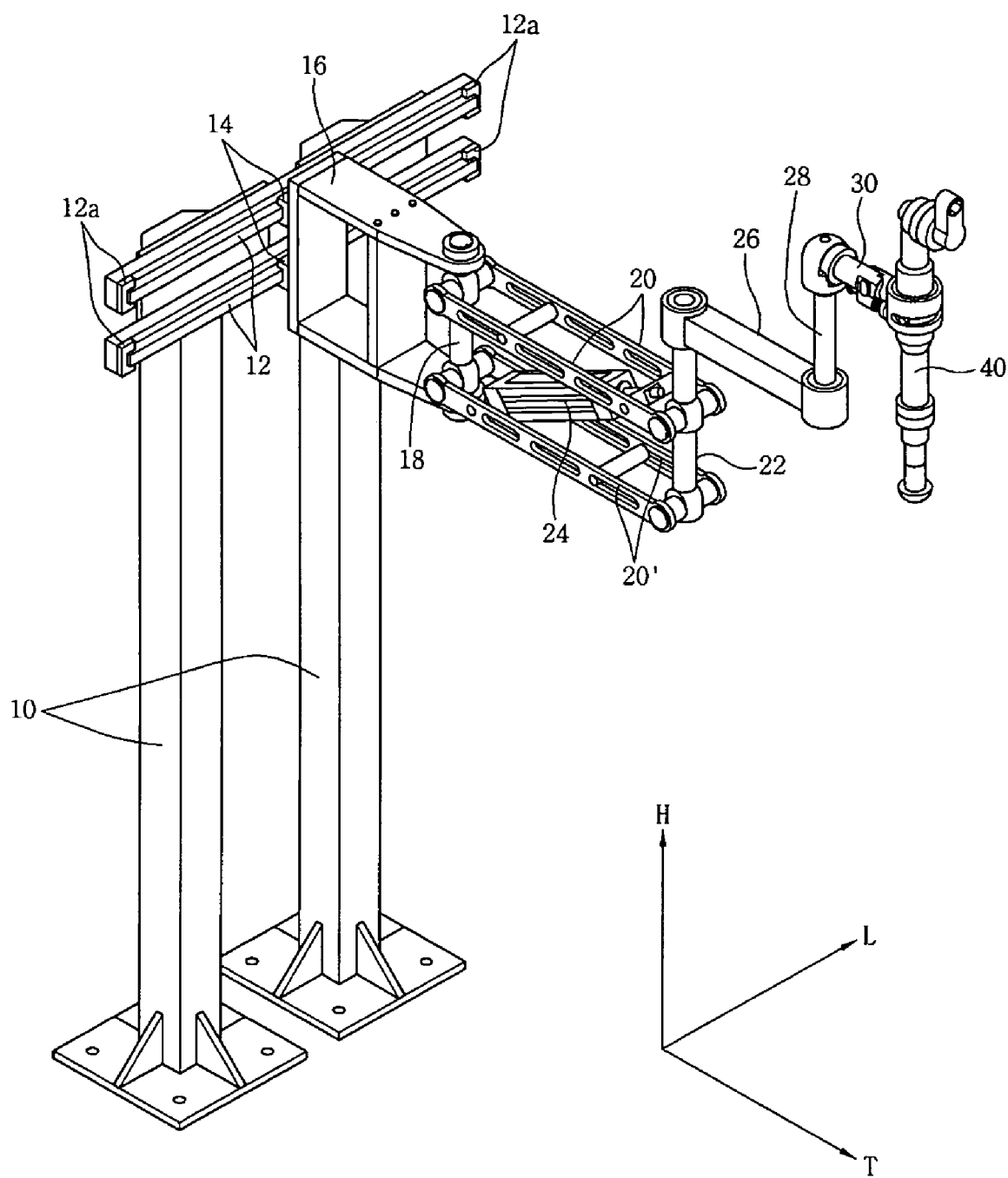
FIG. 1 is a perspective view of the entire construction of a jig for fastening a bolt according to an embodiment of the present invention.

As shown in FIG. 1, in the process of fastening chassis components at the bottom side of a car body, the car body is conveyed by an overhead hanger (not shown) connected to a ceiling of a work place, a support unit stands on the floor of the work place toward the bottom side of the car body, and a movable unit is connected to the support unit so as to be movable in a transverse direction (T), a longitudinal direction (L), and a height direction (H).

The movable unit includes a fastening part for fastening chassis components to the bottom side of the car body, and a load compensating part which compensates load of the fastening part when the fastening part is ascending/descending toward/from the bottom side of the car body in the height direction (H) to reduce the load of the fastening part.

The movable unit includes a tilting part which precisely adjusts the position of the car body with respect to a longitudinal axis, while moving the fastening part, and a reaction force regulating part which sustains reaction force that is generated while the fastening part operates.

The movable unit includes a longitudinally movable part which moves the fastening part along the length direction of the car body with respect to the support unit, a vertically movable part which moves the fastening part along the height direction of the car body with respect to the support unit, and a transversely movable part which moves the fastening part along the width direction of the car body with respect to the support unit.

The support unit is mainly composed of at least a pair of posts 10 standing from the floor of the work place. The longitudinally movable part includes a pair of linear motion guide rails 12 that is horizontally disposed at the upper end of posts 10 along the length direction of the car body, and linear motion blocks 14 that are coupled with the pair of linear motion guide rails 12 so as to be movable along the length direction of the car body.

Linear motion guide rail 12 is provided with hitching protrusions 12a at both leading ends so as to prevent linear motion block 14 from leaving therefrom.

The vertically movable part includes a mounting bracket 16 which is coupled with linear motion block 14 at the rear side of an engaged side, and a 4-node link member which is coupled with mounting bracket 16 at the leading end so as to be rotatable in the vertical direction. The 4-node link member includes a first shaft 18 which is coupled with mounting bracket 16 by a pin at upper and lower ends of the shaft so as to be rotatable with respect to the vertical axis of one end of the mounting bracket, a pair of upper and lower link arms 20,20' whose one end is respectively coupled with first shaft 18 at the upper and lower ends so as to be rotatable with respect to the longitudinal axis, and a second shaft 22 which is coupled with the pair of link arms 20,20' at the other end of the link arms so as to be rotatable with respect to the longitudinal axis.

Accordingly, as shown in FIG. 2, linear motion block 14 which is coupled with mounting bracket 16 can move along the length direction of the car body with respect to linear motion guide rail 12 which is disposed at post 10.

The load compensating part includes a cylinder 24 which is coupled with any one of the pair of link arms 20,20' by a pin, and a piston load 24a which is coupled with the other one of the pair of link arms 20,20' by a pin, and coming from and going into cylinder 24.

Cylinder 24 is provided with operation pressure of oil pressure or air pressure which is required for elevating the movable unit until the movable unit reaches up to the bottom side of the car body from the support unit.

Figure 3:
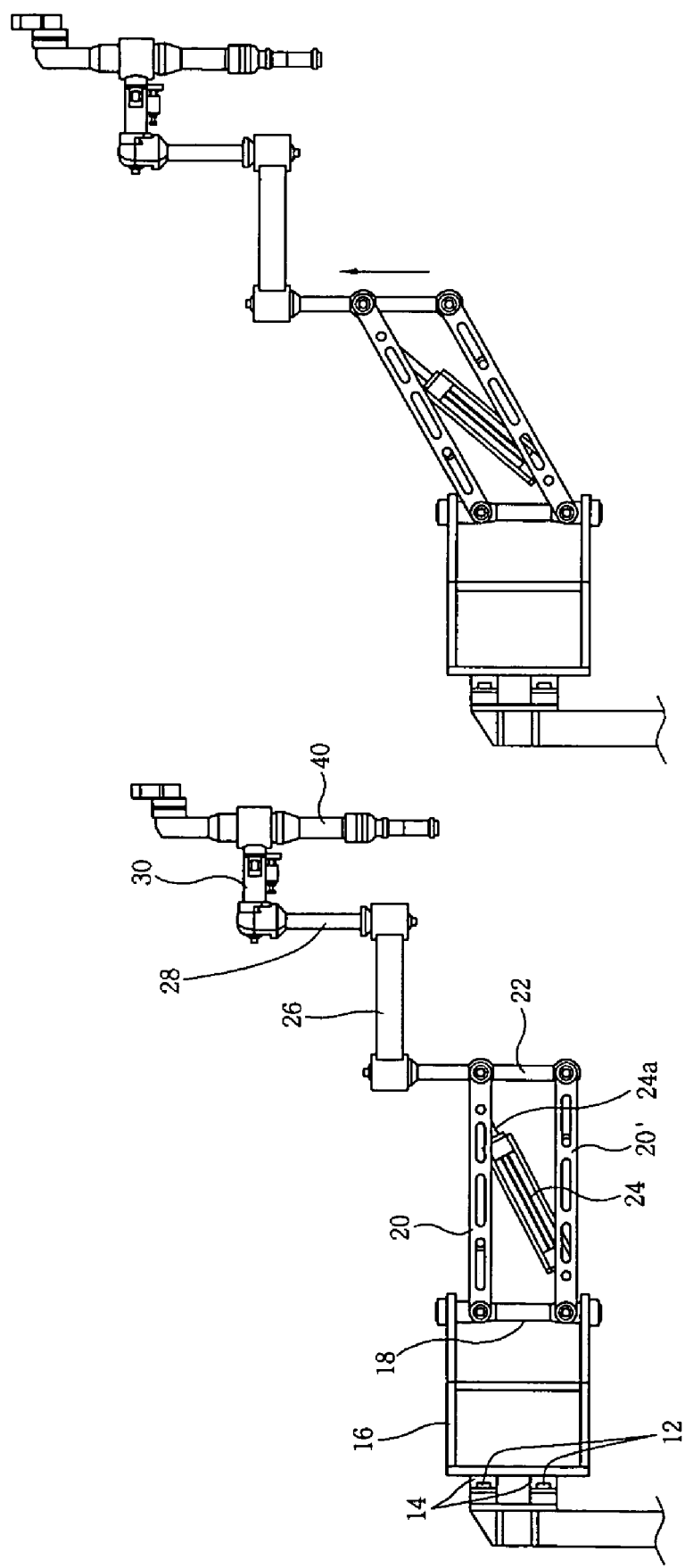

Accordingly, as shown in FIG. 3, because the pair of link arms 20,20' which is coupled with first shaft 18 by a pin at the upper and lower ends of the shaft, second shaft 22 is vertically movable in the height direction of the car body.

Figure 4:
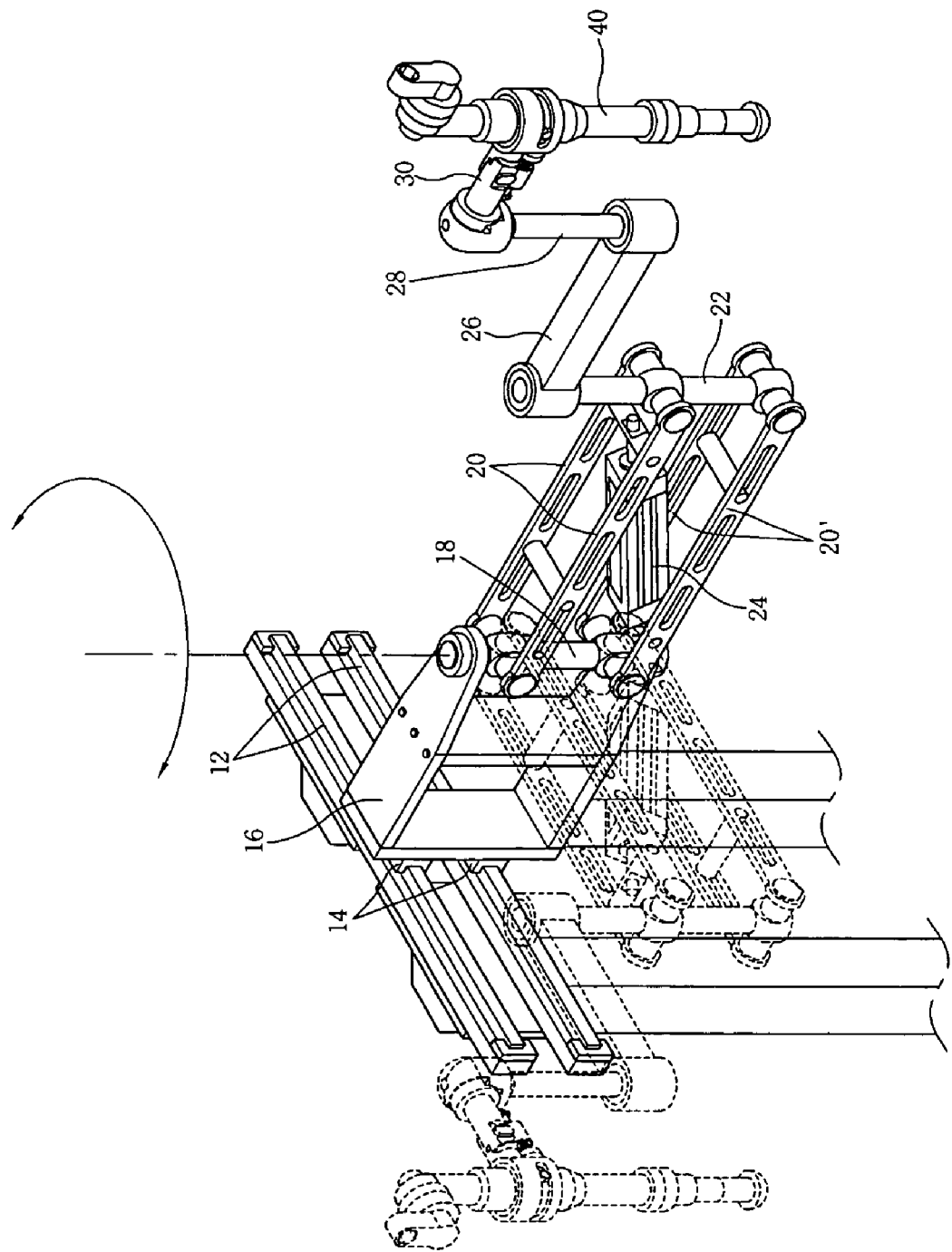

In addition, as shown in FIG. 4, because the pair of upper and lower link arms 20,20' whose one end is respectively coupled with first shaft 18 by a pin at the upper and lower ends so as to be rotatable with respect to the longitudinal axis, second shaft 22 is rotatable along the transverse direction of the car body.

The transversely movable part includes an arm 26 whose one end is coupled with second shaft 22 by a pin at the upper end of second shaft 22 so as to be rotatable with respect to the vertical axis, a roll link shaft 28 whose one end is coupled with arm 26 at the other end of arm 26 so as to be rotatable with respect to the vertical axis, a tool housing link 30 whose one end is coupled with roll link shaft 28 at the other end of roll link shaft 28 so as to be rotatable with respect to the transverse axis.

Figure 5:
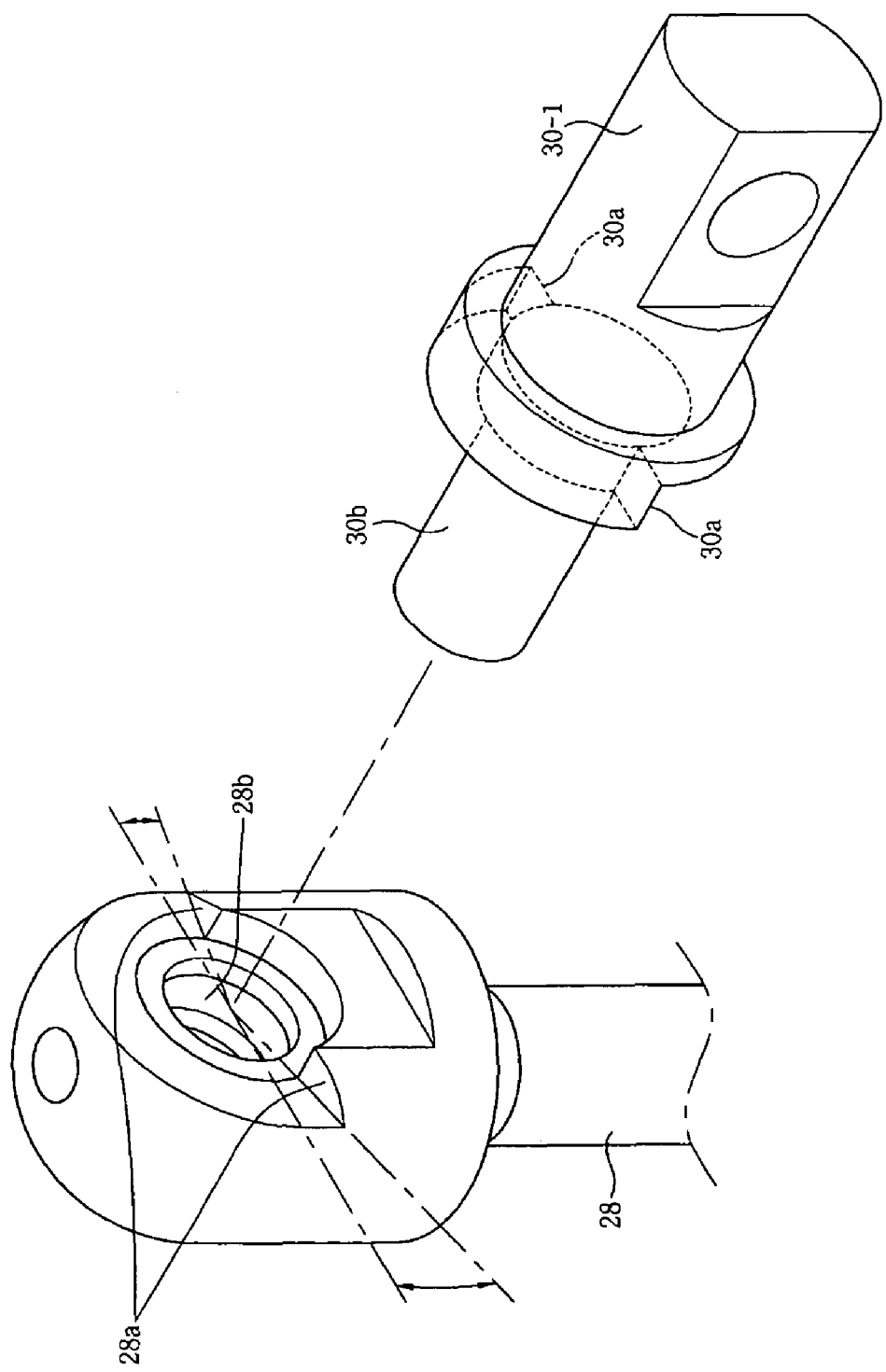
FIG. 5 is a view of the construction of a reaction force regulating unit.

The reaction force regulating part is disposed at a coupled part of roll link shaft 28 and tool housing link 30. Its construction is shown in FIG. 5. The reaction force regulating part includes a receiving surface 28a which is inclined at left/right sides with respect to a horizontal plane passing the center of the coupled part of the leading end of roll link shaft 28, and a left/right engaging surface 30a which protrudes in the horizontal direction with respect to the center of the coupled part so as to correspond to receiving surface 28a at the coupled part of the leading end of tool housing link 30.

The angular difference between receiving surface 28a and engaging surface 30a causes a restricting reaction force in the reverse direction transmitted through tool housing link 30, to be described later, during the operation of the fastening part.

An assembling hole 28b is formed at the center of the coupled part of the leading end of roll link shaft 28, and a rotation shaft 30b is formed at the center of the coupled part of the leading end of tool housing link 30.

Figure 6:
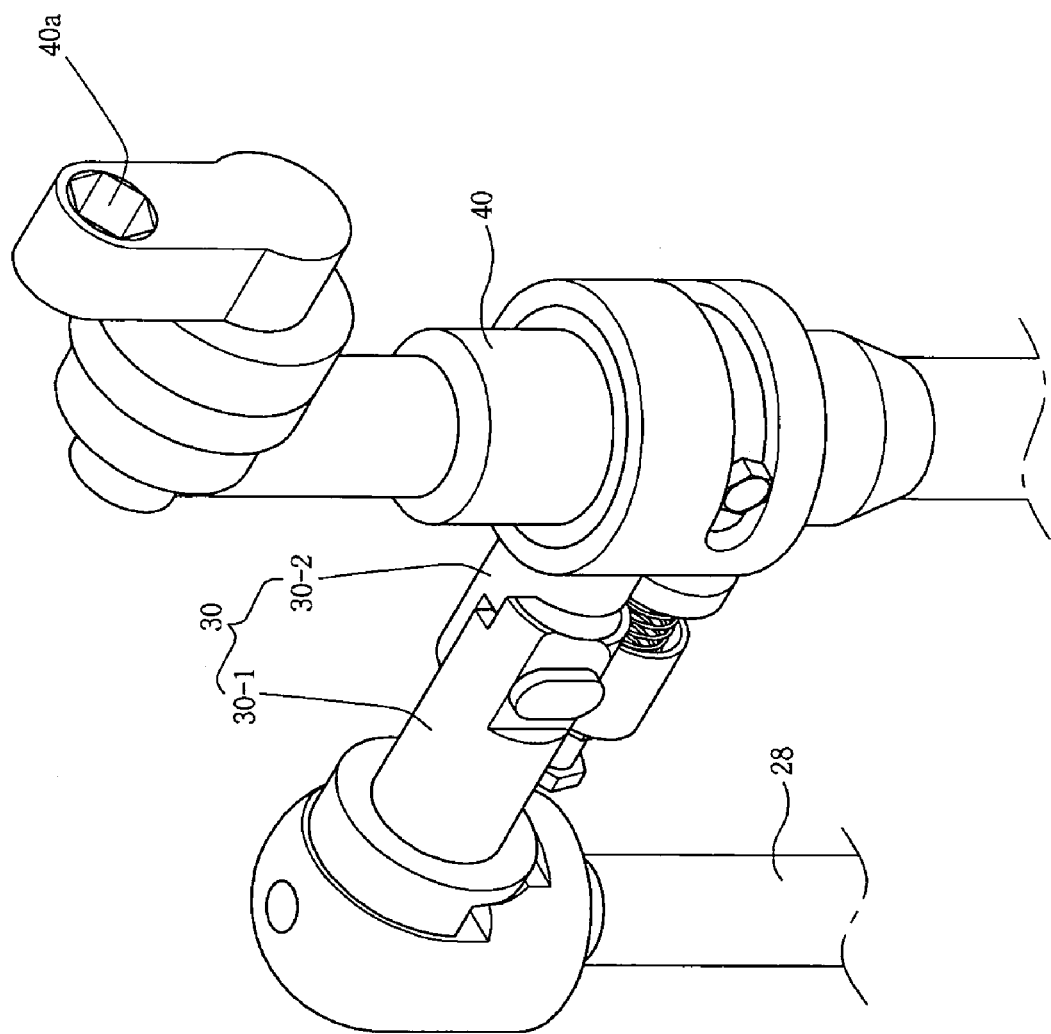
FIG. 6 is a view of the construction of a tool housing link.

As shown in FIG. 6, tool housing link 30 includes a first tool housing link member 30-1 to be coupled with roll link shaft 28, and a second tool housing link member 30-2 to be coupled with first tool housing link member 30-1 by a pin in the longitudinal direction.

Figure 7:
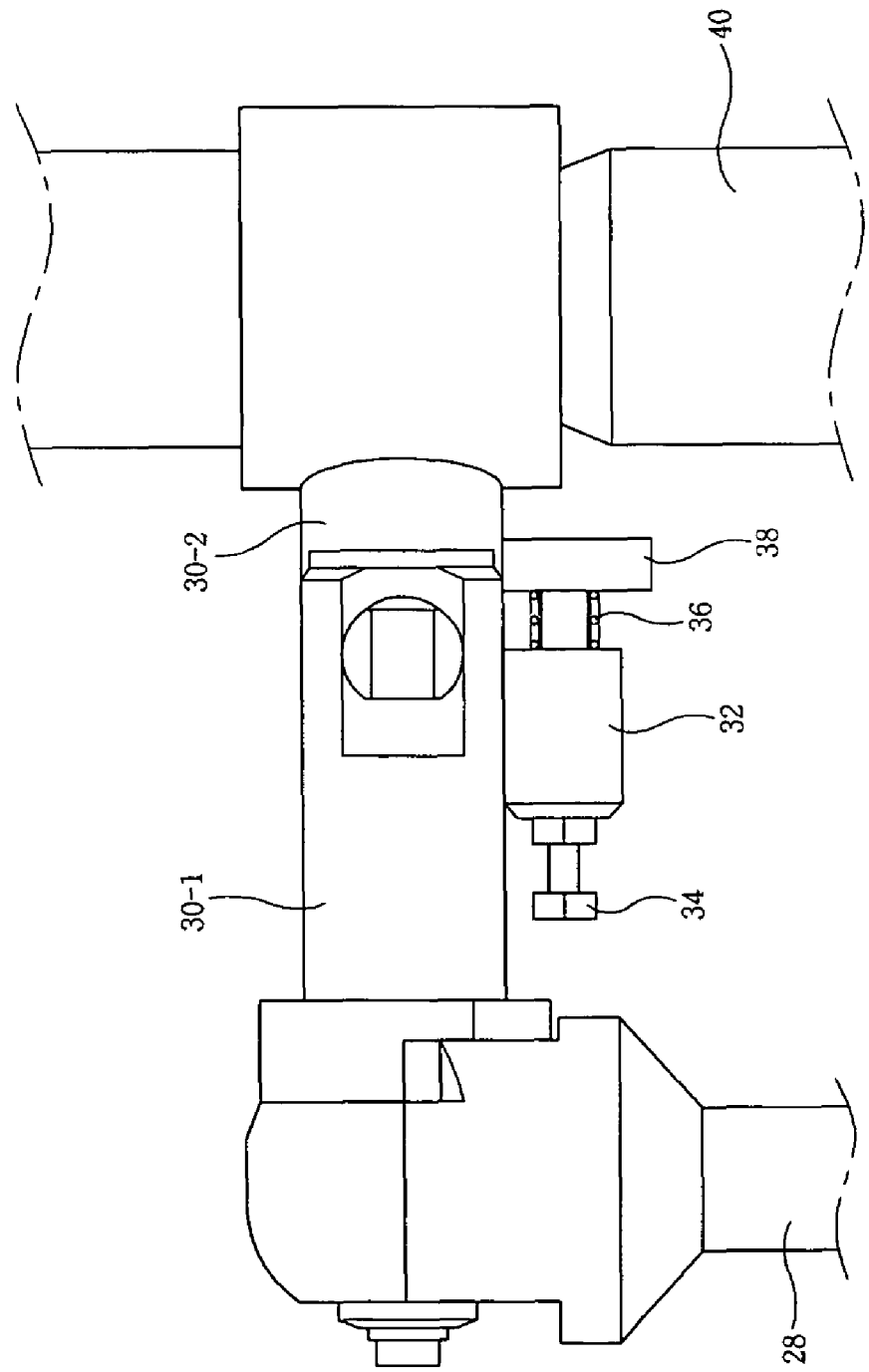
FIG. 7 is a view of the construction of a tilting unit.

As shown in FIG. 7, the tilting part includes a boss portion 32 which has a meshing portion at the inner periphery thereof at the lower surface of first tool housing link member 30-1 so as to be integrated with first tool housing link member 30-1, an adjusting bolt 34 which is fastened into boss portion 32, a spring 36 whose one end is pressed by adjusting bolt 34, and a protrusion piece 38 which is in face contact with the other end of spring 36 at the lower surface of second tool housing link member 30-2 so as to be integrated with second tool housing link member 30-2.

Compression of spring 36 changes on the basis of how tight adjusting bolt 34 is fastened into boss portion 32. The degree of tilting between first tool housing link member 30-1 and second tool housing link member 30-2 is controlled on the basis of the degree of pre-compression of spring 36.

The fastening part includes a nut runner 40 which is coupled with second tool housing link member 30-2 at the other end, and the nut runner 40, as shown in FIG. 8, is supported by a cylinder type outer case 30c integrated with the other end of second tool housing link member 30-2 and an inner case 30d which is forcefully inserted in the inner periphery of outer case 30c so as to relatively rotate.

In this case, outer case 30c includes a stopper bolt 30e to regulate inner case 30d from relatively rotating.

A socket 40a is provided in the nut runner 40 so as to help the nut be fastened.

A bearing member is provided in the pin-coupled part between mounting bracket 16 and first shaft 18, in the pin-coupled part between first shaft 18 and link arms 20,20', in the pin-coupled part between link arms 20,20' and second shaft 22, in the pin-coupled part between second shaft 22 and arm 26, in the pin-coupled part between arm 26 and roll link shaft 28, and in the pin-coupled part between tool housing link 30 and nut runner 40, that is, between outer case 30c and inner case 30d, which allows each of the members to relatively rotate.

Therefore, as the car body is conveyed to the assembly line by the overhead hanger, the worker elevates nut runner 40 under the car body from post 10 up to the work position of the bottom side of the car body. Cylinder 24 and piston load 24a not only help link arms 20,20', that is, the 4-node link member to rotate, but also restrict arm 26 including nut runner 40, roll link shaft 28, and tool housing link 30 from descending from the elevated position.

The worker then operates nut runner 40 to fasten a nut to arms of the suspension system.

Because linear motion guide rail 12 and linear motion block 14 allow nut runner 40 to move along the length direction of the car body, the worker can easily fasten arms located at front and rear sides of the car body.

In addition, when first shaft 18 which is pin-coupled with mounting bracket 16, arm 26 which is pin-coupled with second shaft 22, and roll link shaft 28 which is pin-coupled with arm 26 are properly rotated, nut runner 40 can rotate in the transverse direction of the car body, which improves the movement of nut runner 40 during the process of fastening.

Since the reaction force regulating part regulates reaction force torque input in the reverse direction during the fastening of nut runner 40, the work process can be smoothly performed. Further, the tilting part adjusts a precise difference of displacement between nut runner 40 and the fastened part, which helps in adjusting a right position during the process of fastening.

Figure 9:
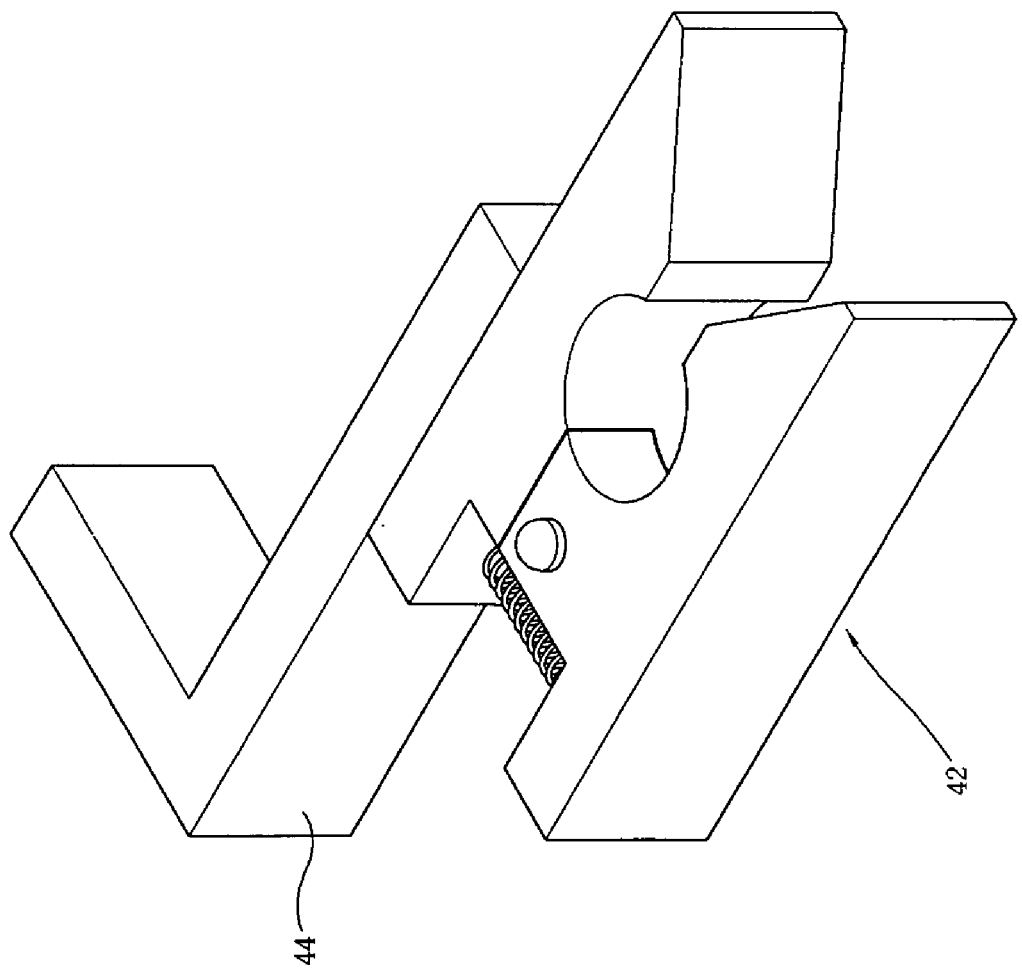
FIG. 9 is a view of a stationary jig preventing the jig from moving when the jig is not in use.

The jig for tightening a bolt can be fixed to a wheel alignment equipment using a stationary jig 42 which is coupled with arm 26 and roll link shaft 28 in a nipper shape, as shown in FIG. 9, when the jig is not used. Therefore, it is possible to prevent the jig for tightening a bolt from undesirably moving when the worker moves. An engaging bar 44 is integrated with stationary jig 42 so as to be fixed to the wheel alignment equipment.

As described above, the jig for tightening a bolt according to the invention provides advantages of moving the nut runner to a fastening location more easily and adjusting the location of the nut runner for each working position more easily, in the process of fastening arms of a suspension system at the bottom side of a car body that is conveyed by an overhead hanger.

In addition, the worker does not need to support the nut runner, which reduces harm that may be caused in muscles and bones of workers.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A jig for tightening a bolt, comprising:
    a support unit configured to stand on a floor of a work place and extend toward a bottom side of a car body which is conveyed by an overhead hanger;
    a movable unit connected to the support unit so as to be movable in a transverse direction of the car body, a longitudinal direction of the car body, and a height direction of the car body;
    a fastening part disposed in the movable unit to fasten chassis components to the bottom side of the car body;
    a load compensating part compensating load of the fastening part when the fastening part ascends/descends toward/from the bottom side of the car body;
    a tilting part adjusting a position of the fastening part; and
    a reaction force regulating part sustaining reaction force that is generated while the fastening part is operated;
    wherein the movable unit comprises a longitudinally movable part which moves the fastening part along the longitudinal direction of the car body with respect to the support unit, a vertically movable part which moves the fastening part along the height direction of the car body with respect to the support unit, and a transversely movable part which moves the fastening part along the transverse direction of the car body with respect to the support unit;
    wherein the transversely movable part comprises:
        an arm comprising a first end coupled with the vertically movable part so as to be rotatable with respect to the vertical axis;
        a roll link shaft comprising a first end coupled with the arm at a second end of the arm so as to be rotatable with respect to the vertical axis; and
        a tool housing link comprising an end coupled with the roll link shaft at a second end of the roll link shaft so as to be rotatable with respect to a transverse axis;
    wherein the reaction force regulating part comprises:
        a receiving surface which is inclined with respect to a horizontal plane at a coupled part of a leading end of the roll link shaft; and
        an engaging surface which protrudes in a horizontal direction so as to correspond to the receiving surface at a coupled part of a leading end of the tool housing link.

2. The jig as defined in claim 1, wherein the support unit comprises a plurality of posts standing on the floor of the work place.

3. The jig as defined in claim 2, wherein the longitudinally movable part comprises:
    linear motion guide rails that are horizontally disposed at the upper end of the posts along the longitudinal direction of the car body; and
    linear motion blocks that are coupled with the linear motion guide rails so as to be movable along the longitudinal direction of the car body.

4. The jig as defined in claim 3, wherein the vertically movable part comprises:
    a mounting bracket which is coupled with the linear motion block, and
    a 4-node link member which is coupled with the mounting bracket so as to be rotatable.

5. The jig as defined in claim 4, wherein the 4-node link member comprises:
    a first shaft which is coupled with the mounting bracket by a pin at upper and lower ends of the first shaft so as to be rotatable with respect to a vertical axis of an end of the mounting bracket;
    a pair of upper and lower link arms, each comprising a first end coupled with the first shaft at the upper and lower ends so as to be rotatable with respect to a longitudinal axis, and
    a second shaft which is coupled with the pair of link arms at a second end of the link arms so as to be rotatable with respect to the longitudinal axis.

6. The jig as defined in claim 5, wherein the load compensating part comprises:
    a cylinder which is coupled with any a first one of the pair of link arms by a pin, and
    a piston load which is coupled with a second one of the pair of link arms by a pin and comes from and goes into the cylinder.

7. The jig as defined in claim 1, wherein:
    the tool housing link comprises a first tool housing link member to be coupled with the roll link shaft, and a second tool housing link member to be coupled with the first tool housing link member by a pin in the longitudinal direction; and
    the tilting part comprises a boss portion which has a meshing portion at the lower surface of the first tool housing link member so as to be integrated with the first tool housing link member, an adjusting bolt which is fastened into the boss portion, a spring comprising a first end pressed by the adjusting bolt, and a protrusion piece which is in face contact with a second end of the spring at the lower surface of the second tool housing link member so as to be integrated with the second tool housing link member.

8. The jig as defined in claim 7, wherein the fastening part comprises a nut runner which is coupled with the second tool housing link member.

9. The jig as defined in claim 8, wherein the nut runner is supported by a cylinder type outer case integrated with the second tool housing link member and an inner case which is coupled with an inner periphery of the outer case so as to relatively rotate.

10. The jig as defined in claim 9, wherein the outer case comprises a stopper bolt to regulate the inner case from relatively rotating.

11. A jig for tightening a bolt, comprising:
    a support unit configured to stand on a floor of a work place and extend toward a bottom side of a car body which is conveyed by an overhead hanger;
    a movable unit connected to the support unit so as to be movable in a transverse direction of the car body, a longitudinal direction of the car body, and a height direction of the car body;
    a fastening part disposed in the movable unit to fasten chassis components to the bottom side of the car body;
    a load compensating part compensating load of the fastening part when the fastening part ascends/descends toward/from the bottom side of the car body;
    a tilting part adjusting a position of the fastening part; and a reaction force regulating part sustaining reaction force that is generated while the fastening part is operated;

wherein the movable unit comprises a longitudinally movable part which moves the fastening part along the longitudinal direction of the car body with respect to the support unit, a vertically movable part which moves the fastening part along the height direction of the car body with respect to the support unit, and a transversely movable part which moves the fastening part along the transverse direction of the car body with respect to the support unit, wherein the support unit comprises a plurality of posts standing on the floor of the work place, wherein the longitudinally movable part comprises:
   linear motion guide rails that are horizontally disposed at the upper end of the posts along the longitudinal direction of the car body; and linear motion blocks that are coupled with the linear motion guide rails so as to be movable along the longitudinal direction of the car body, wherein the vertically movable part comprises:
   a mounting bracket which is coupled with the linear motion block, and
   a 4-node link member which is coupled with the mounting bracket so as to be rotatable, wherein the 4-node link member comprises:
   a first shaft which is coupled with the mounting bracket by a pin at upper and lower ends of the first shaft so as to be rotatable with respect to a vertical axis of an end of the mounting bracket;
   a pair of upper and lower link arms, each comprising a first end coupled with the first shaft at the upper and lower ends so as to be rotatable with respect to a longitudinal axis, and
   a second shaft which is coupled with the pair of link arms at a second end of the link arms so as to be rotatable with respect to the longitudinal axis, wherein the transversely movable part comprises:
   an arm comprising a first end coupled with the second shaft by a pin at an upper end of the second shaft so as to be rotatable with respect to the vertical axis,
   a roll link shaft comprising a first end coupled with the arm at a second end of the arm so as to be rotatable with respect to the vertical axis, and a tool housing link comprising an end coupled with the roll link shaft at a second end of the roll link shaft so as to be rotatable with respect to a transverse axis, wherein the reaction force regulating part comprises:
   a receiving surface which is inclined with respect to a horizontal plane at a coupled part of a leading end of the roll link shaft, and
   an engaging surface which protrudes in a horizontal direction so as to correspond to the receiving surface at a coupled part of a leading end of the tool housing link.

12. The jig as defined in claim 11, wherein the load compensating part comprises:
   a cylinder which is coupled with any a first one of the pair of link arms by a pin, and
   a piston load which is coupled with a second one of the pair of link arms by a pin and comes from and goes into the cylinder.

13. The jig as defined in claim 11, wherein:
   the tool housing link comprises a first tool housing link member to be coupled with the roll link shaft, and a second tool housing link member to be coupled with the first tool housing link member by a pin in the longitudinal direction; and
   the tilting part comprises a boss portion which has a meshing portion at the lower surface of the first tool housing link member so as to be integrated with the first tool housing link member, an adjusting bolt which is fastened into the boss portion, a spring comprising a first end pressed by the adjusting bolt, and a protrusion piece which is in face contact with a second end of the spring at the lower surface of the second tool housing link member so as to be integrated with the second tool housing link member.

14. The jig as defined in claim 13, wherein the fastening part comprises a nut runner which is coupled with the second tool housing link member.

15. The jig as defined in claim 14, wherein the nut runner is supported by a cylinder type outer case integrated with the second tool housing link member and an inner case which is coupled with an inner periphery of the outer case so as to relatively rotate.

16. The jig as defined in claim 15, wherein the outer case comprises a stopper bolt to regulate the inner case from relatively rotating.

* * * * *